(12) United States Patent
Krisik et al.

(10) Patent No.: US 8,523,350 B2
(45) Date of Patent: Sep. 3, 2013

(54) ARTICULATING EYEGLASS RETAINER SYSTEM

(75) Inventors: John Krisik, Jackson, WY (US); Peter Weurslin, Jackson, WY (US)

(73) Assignee: Croakies, Inc., Jackson, WY (US)

( * ) Notice: Subject to any disclaimer, the term of this patent is extended or adjusted under 35 U.S.C. 154(b) by 228 days.

(21) Appl. No.: 13/134,357

(22) Filed: Jun. 6, 2011

(65) Prior Publication Data

US 2012/0307199 A1    Dec. 6, 2012

(51) Int. Cl.
*G02C 3/00* (2006.01)

(52) U.S. Cl.
USPC .......................................... 351/156; 351/157

(58) Field of Classification Search
USPC .................................... 351/156, 157, 158, 41
See application file for complete search history.

(56) References Cited

U.S. PATENT DOCUMENTS

| | | | |
|---|---|---|---|
| 6,709,100 B2* | 3/2004 | Kalbach | 351/156 |
| 6,764,177 B1* | 7/2004 | Chisolm | 351/157 |

FOREIGN PATENT DOCUMENTS

GB    2 280 042 A   *  1/1995

* cited by examiner

*Primary Examiner* — Hung Dang
(74) *Attorney, Agent, or Firm* — Andrew D. Maslow

(57) ABSTRACT

An improved eyeglass retainer system is provided which comprises one or more semi-rigid straps or cables to attach to the ends of the temples of eyeglasses. Means for attaching each end of said strap or cable to the ends of the temples of the eyeglasses are provided. Such means enable the strap or cable to be maintained in more than one fixed position away from the head and neck of the wearer when the eyeglasses are worn over the ears of said wearer.

5 Claims, 5 Drawing Sheets

ARTICULATING EYEGLASS RETAINER SYSTEM

BACKGROUND OF THE INVENTION

1. Field of the Invention

This invention relates to eyeglass retainers used to secure a pair of eyeglasses to the head of the wearer. In particular the invention relates to an improved system to maintain the strap or cable of eyeglass retainer in several fixed positions so the strap or cable does not dangle against the head or neck of the wearer.

2. Description of the Prior Art

The most common device used today to secure eyeglasses on a person's head is a strap worn behind the wearer's head, connecting end portions of the two eyeglass temples. However, eyeglass straps are not always preferred or appropriate. Some people do not want the visibility of a strap. At work or formal events, an eyeglass strap may be distracting or may appear too casual. Other times a strap may be undesirable because of the effect it has on the wearer's hair. Some wearers object to the strap hanging down to touch the face, neck or hair and thereby annoying annoy the wearer.

U.S. Pat. No. 4,133,604 discloses the commercially successful eyeglass retainer sold under the well know Croakies trademark which is comfortable and securely holds the eyeglasses in position. If not secured tightly to the wearers head the strap hangs down and can touch the back of the neck of the wearer.

U.S. Pat. No. 2,481,946 illustrates a neck retainer for eyeglasses which has a small tubular member attached to a fabric strap which fits around the neck, and holds the glasses in position when the eyeglasses are actually off. The strap is to hold the glasses in place around a person's neck, rather than retain the glasses in a position during use.

A similar device is shown in U.S. Pat. No. 2,704,961 where a neck strap is utilized for retaining the eyeglasses in position when the eyeglasses are removed from the face and are supported around the neck.

U.S. Pat. No. 3,450,467 illustrates an eyeglass retainer that grips the eyeglasses and attaches to the temple pieces or bows of the eyeglasses to hold the eyeglasses in position. A neck strap for supporting eyeglasses when removed is shown in U.S. Pat. No. 3,879,804 which illustrates a band that clips onto eyeglasses or goggles and will grip the eyeglasses or goggles through a tightening loop connection. A similar type device is shown in U.S. Pat. No. 3,874,776.

U.S. Pat. No. 3,502,396 illustrates a non-stretch adjustable eyeglass holder that fits behind the head during use and has a series of holes for a fastener that provides for adjustment of the length of the strap after the strap has been attached to the temples of the eyeglasses.

Other patents that disclose eyeglass retainers include U.S. Pat. Nos. 2,539,922, 4,657,364, 4,541,696 and 4,793,702. In the later patent the inventors allege that by using a tape to form the tubes of the eyeglass retainer disclosed in U.S. Pat. No. 4,133,604, the tubes allegedly grip the temples of the eyeglass more securely than tubes made with a sewn seam.

U.S. Pat. No. 7,441,891 recognizes the problem of a dangling strap of an eyewear retainer and provides pivoting temple arms attached to the temples of the eyeglasses without the need for a strap.

U.S. Pat. No. 1,819,738 discloses an eyeglass retainer made of a material with sufficient strength to maintain an arc while being worn over the ears and US Published Patent Application 2007/0046889 discloses that a cable can be used for the strap that connects the two temples of an eyeglass retainer.

U.S. Pat. No. 7,467,867 provides an eyewear retention device with a cable having sufficient strength so that, when worn on eyeglasses over the ears, the cable is suspended in an arc above the wearer's neck, shoulders or garments but in only one position.

None of the prior art patents disclose a comfortable eyeglass retainer that utilizes a strap or cable to secure the eyeglasses to the wearers-head or neck and yet, when the eyeglasses are being worn, the retainer maintains the strap in multiple fixed positions away from the wearers head or neck.

SUMMARY OF THE INVENTION

The term "semi-rigid strap" means any material that can be used as a strap attached at each end to the temples of eyeglasses to prevent them from falling of the wearer and which has sufficient strength to maintain itself in an arc while the eyeglasses are worn over the wearer's ears.

The term "articulated joint" means a device by which two sections of a device are linked together so as to allow greater flexibility of movement. One example is known as a ball and socket joint. It sometimes is also called just a ball joint which is a joint between rods, links, pipes, etc., consisting of a ball-like termination on one part held within a concave, spherical socket on the other (cone).

The present invention relates to an eyeglass retainer for holding eyeglasses in position on the head of the wearer during use. The retainer includes a semi-rigid strap, which is preferably a cable or monofilament, which is attached at both ends to means for attaching the strap or cable to the temples of the eyeglasses. Said means can be an elastic tube with an opening on one end of sufficient size to fit onto the end of the temple of the eyeglasses. When the strap is attached at both end to the temples of the eyeglasses, and the eyeglasses are worn over the ears of the wearer, means are provided to maintain the strap or cable away from the head and neck of the wearer in more than one position.

An articulated joint may be used to maintain the strap or cable away in multiple positions away from the head of the wearer of the eyeglasses. The articulated joint may be a typical ball and socket joint where the ball is attached to the means for attaching the end of the strap or cable to the eyeglasses. The socket is attached to the end of the strap or cable and fits onto the ball with sufficient friction so that the strap or cable can remain is a fixed position but when pressure is applied to the joint the ball can rotate in the socket so that the cable can be held in numerous other positions. The reverse is possible with the ball being attached to the end of the strap or cable and the socket is attached to the means for attaching the end of the strap or cable to the eyeglasses.

In the preferred embodiment the diameter of the lining of the cone is slightly less than the ball creating an interference fit or friction fit. The friction fit allows the joint to be moved under force and then stay in the position where it is left. This enables the socket to be held in place on the ball when they are connected, but on the application of force pulling the socket away from the ball it can be detached. The exact circumference of the socket will depend on the material chosen for the ball and socket. If it is desired for the ball and socket to separate with little or no force the diameter of the opening of the cone would be equal to the diameter of the ball. If the opening diameter of the cone was a little less then the diameter of the ball it would take a little force to separate them. If the opening was even a little smaller it would take a little more force. As an example, the ball has a 0.185 inch diameter and the diameter of the opening in the cone is 0.173 inch diameter. The inner diameter of the cone that surrounds the ball was ever so slightly less then the 0.185 inch diameter of the ball. That interference makes the cone stay in place when it is articulated. By varying the ratios of the circumference of the ball to the circumference of the inner surface of the socket one would be affecting the interference fit which would effect the force it took to articulate the socket or to move the cone and cable up and down. By varying the ratios of the circumference of the ball to the circumference of the opening of the socket (or cone) one would be affecting the pop apart force. Preferably the ball and socket are made of plastic with good hardness and little creep.

It is an object of the invention to provide a single eyeglass retainer strap that attaches to both the temples of the eyeglasses that does not touch the head, neck or hair of the wearer and can be maintained in more than one position while the eyeglasses are being worn.

Another object of the invention is to provide an eyeglass retainer that has attachments of varying sizes that can be interchanged to fit temples of varying thicknesses.

Still another object of the invention is to provide an eyeglass retainer system that can be readily detached and reattached from the eyeglasses.

Yet another object of the invention is to provide an eyeglass retainer with the above advantages that has a cable that is less visible than a strap.

DETAILED DESCRIPTION OF THE DRAWINGS

Figure 1:
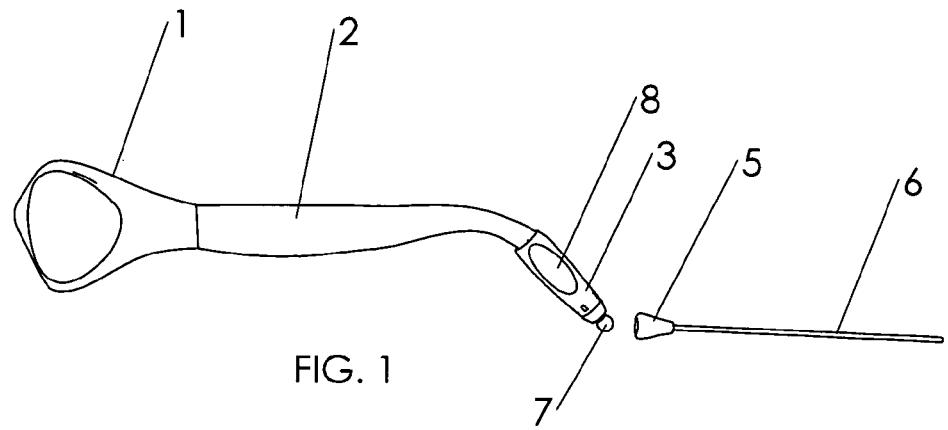
FIG. 1 is a side view of eyeglasses and one end of the retainer of the invention where the cable or strap is detached.

In FIG. 1 eyeglasses 1 having temples 2 are shown with an elastic attaching tube 3 having depression 8. The elastic tube also has opening 4 shown in FIG. 4 and in FIG. 9 through which the end of eyeglass temple 2 has been inserted. Ball element 13, shown in FIGS. 5-8 is attached to elastic attaching tube 3 by being inserted into attaching tube 3 and held in place by nubs 12, shown in FIGS. 5-8, being fitted into holes 10 in tube 3. Preferably there are four respective nubs 12 and holes 10.

In FIG. 1 one end of cable 6 is shown with socket or cone 5 attached and truncated ball 7 is not connected to socket 5 hence cable 6 is detached from the eyeglasses. It can be readily seen that there can be many different length cables provided that can be interchangeable which can all fit on the eyeglasses without having to remove tube 3 and ball joint 13 from the eyeglasses.

Similarly, the same cable 6 with socket 5 can be attached to various sizes of tubes 3 having different sized openings 4 but with the same size ball or truncated ball 7 as part of ball joint 13. This allows the same cable to be attached to eyeglasses with temples of varying thickness, by simply changing tube 3 to one that has the appropriate size opening 4.

Figure 2:
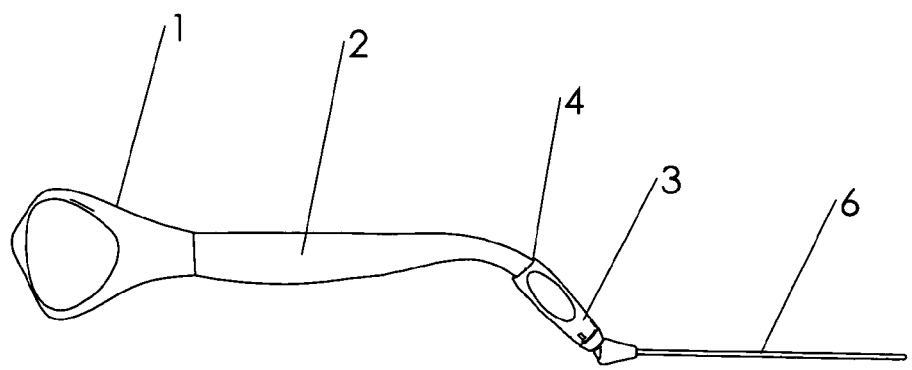
FIG. 2 is a side view of eyeglasses and one end of the retainer of the invention where the cable or strap is attached to the eyeglasses and held in a first position.

In FIG. 2. cable 6 is shown attached to ball or truncated ball 7 of ball joint 13 inserted into attaching tube 3. Cable 6 is held in a fixed first position as a result of friction due to a tight fit of truncated ball 7 into socket 5.

Figure 3:
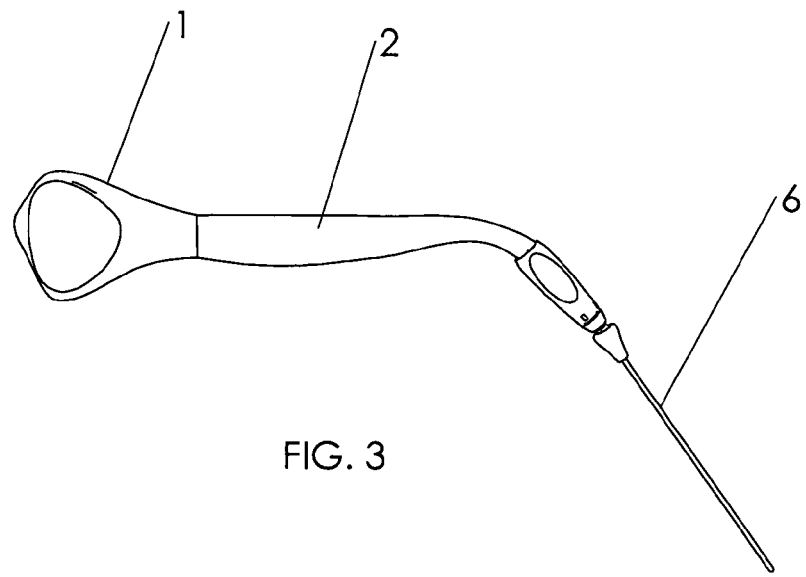
FIG. 3 is a side view of eyeglasses and retainer and one end of the invention where the cable or strap is attached to the eyeglasses and held in a second position.

In FIG. 3. cable 6 is shown held in a second position relative to eyeglasses 1. This is achieved by the application of a downward force to cable 6 so that socket 5 moves relative to truncated ball 7.

Figure 4:
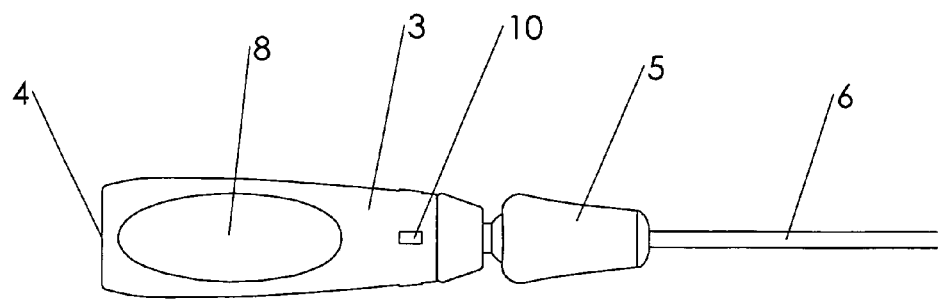
FIG. 4 is an enlarged side view of one end of the eyeglass retainer of the invention with the cable attached.

In FIG. 4 the hole or slot 10 adapted to fit nub 12 is shown. Indentation 8 serves to allow the tube 3 to expand to fit a larger range of diameters for the temple of the eyeglasses which may be inserted into tube 3.

Figure 5:
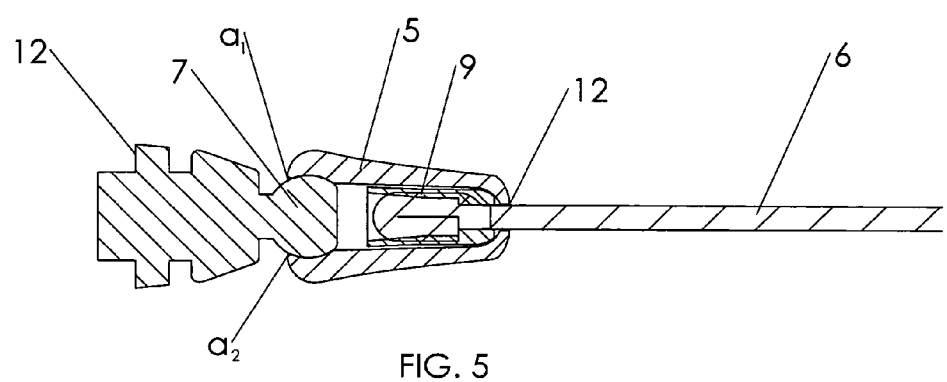
FIG. 5 is a cross section of one end of the eyeglass retainer of the invention with the cable being held in a first position.
Figure 6:
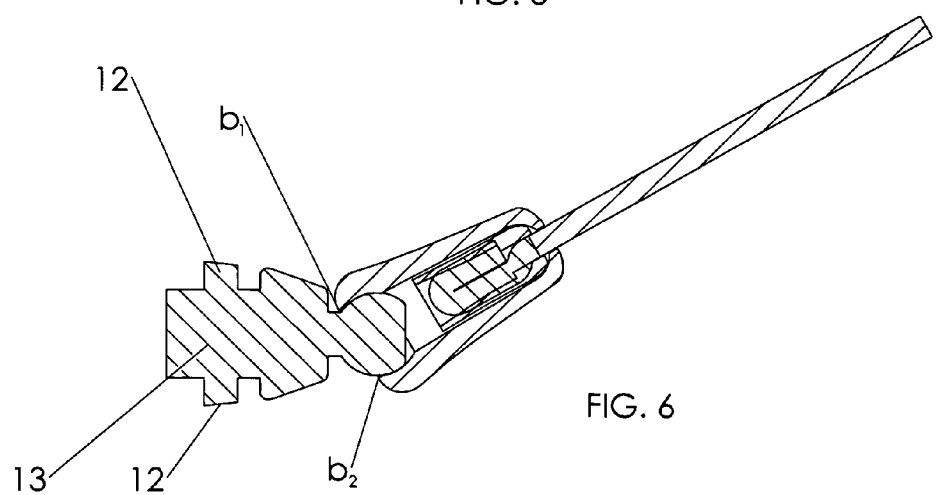
FIG. 6 is a cross section of one end of the eyeglass retainer of the invention with the cable being held in a second position.

In FIGS. 5 and 6 cable 6 is held in the first and second positions respectively. The distance from point a1 to a2 defines the opening of socket (or cone) 5. When an upward force is applied to cable 6 in FIG. 5, the points a1 and a2 on the socket move relative to truncated ball 7 along the arc of the outer surface of truncated ball 7 to points b1 and b2 on said surface. Cable 6 is now maintained in a second fixed position. It can be seen that by varying the distance of a1 to a2 to more closely approach the diameter of truncated ball 7 it will become easier to detach socket 5 from ball 7. The exact dimensions can vary depending on the extent of flexibility of the material from which socket 5 is made. Preferably ball 7 and socket 5 are made from a plastic such as acetals, nylons, polycarbonates, PC/ABS. Preferably the plastic is polypropylene, but most importantly the plastic would need to have a high hardness and a low creep. Creep is how much the material moves over time when under force. If it moved too much the fit between the ball and the socket would relax, so the parts would pop apart easier and easier and the force needed to articulate the parts would become easier and easier.

Figure 7:
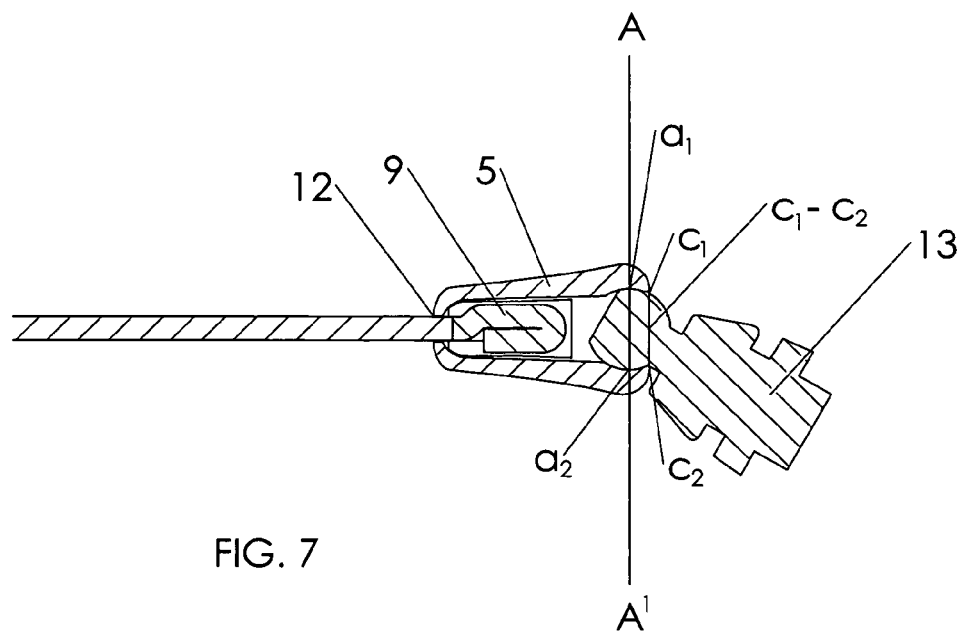
FIG. 7 is an enlarged cross section of one end of the eyeglass retainer of the invention which shows the articulating joint in the second position.

In FIG. 7 the diameter of the ball 7 is measured form point a1 to a2. It can be seen that the diameter of the arcs defined by the inner surface or lining of socket 5 is also defined by points a1 and a2, but in practice may be very slightly less than the diameter of the ball. Thus ball 7 will fit snuggly into socket 5 so that there is sufficient friction to inhibit movement between said ball member and socket member but still allows articulate movement when sufficient force is applied to one or both of such members. Also shown in FIG. 7 is the size of the opening of socket 5 being defined as the distance between point C1 and C2 which is less than the distance from point a1 to a2, once again preventing socket 5 from being detached from ball 7. It one desires to have the ball and socket remain attached at all times, distance C1-C2 can be made sufficiently small so that detachment does not occur. Conversely if distance C1-C2 is made to closely approximate, but not equal distance a1-a2, then socket 5 can be more easily removed but still hold ball 7 in socket 5. FIG. 7 shows the ball joint in the second position relative to socket 5.

In FIG. 7 it can be seen that socket 5 has an opening 12 through which one end of cable 6 has been inserted. A stop 9 is attached to the end of cable 6 which prevents the end of the cable from being drawn back through opening 12.

Figure 8:
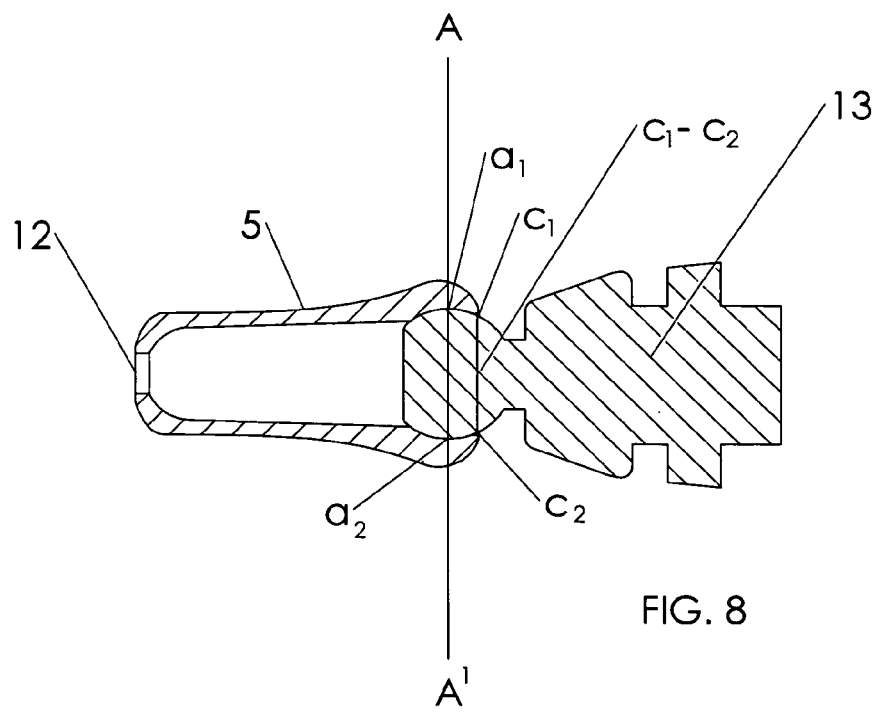
FIG. 8 is an enlarged cross section of the articulating joint of the eyeglass retainer of the invention in the first position.
Figure 10:
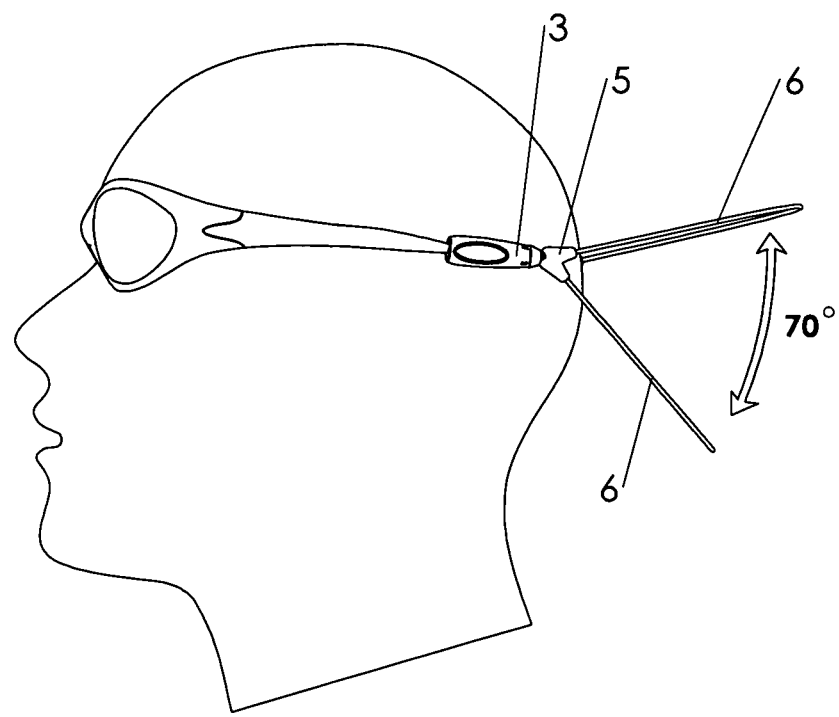
FIG. 10 is a perspective view of eyeglasses being worn by the user with the eyeglass retainer of the invention and the range of motion of the cable by virtue of the articulating joint.
Figure 11:
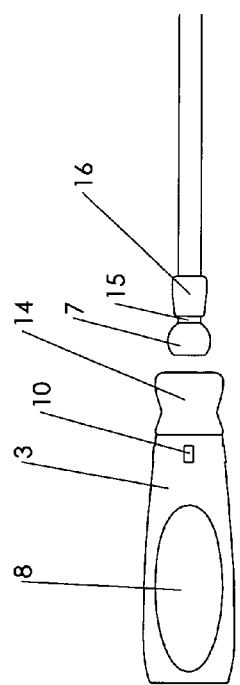
FIG. 11 is another side view of eyeglasses and one end of the retainer of the invention where the cable or strap is detached but where the ball portion of the joint is attached to the cable.
Figure 12:
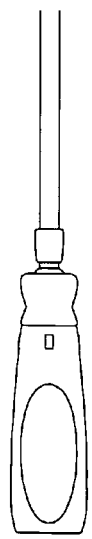
FIG. 12 is another a side view of eyeglasses and one end of the retainer of the invention where the cable or strap is attached to the eyeglasses and held in a first position but where the ball portion of the joint is attached to the cable.
Figure 13:
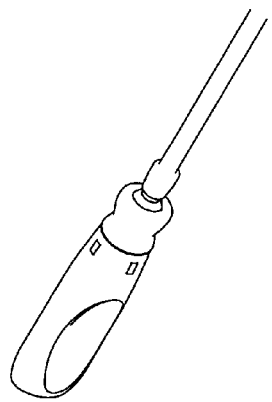
FIG. 13 is a perspective view of the articulating joint where the ball portion of the joint is attached to the cable

In FIG. 8 ball element 13 is shown in the first position relative to socket 5. It should be understood that it is possible for there to be many positions in between the first and second positions. The range of motion of the articulating joint and hence cable 6 is shown in FIG. 10.

Figure 9:
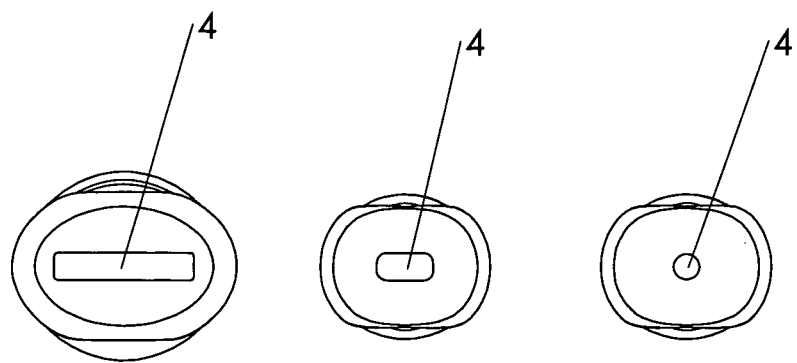
FIG. 9 is three end views of the elastic exchangeable attaching means each having a different size opening.

It should be understood that cable 6 can be made of many materials that have sufficient strength so that cable is maintained in an arc as shown in FIG. 9. Such materials include steal wire stranded cable, solid wire, solid monofilament any metal stranded wire, and the like and is preferably stranded stainless steel wire or monofilament.

Elastic tube 3 can made of any flexible material that can grip the temple of the eyeglasses and is preferably a thermoplastic elastomer or molded silicon.

It will thus be seen that the objects set forth above, among those made apparent from the preceding description, are efficiently attained and, since certain changes may be made in carrying out the above eyeglass retainer without departing from the spirit and scope of the invention, it is intended that all matter contained in the above description and shown in the accompanying drawings shall be interpreted as illustrative ant not in a limiting sense.

It is also to be understood that the following claims are intended to cover all of the generic and specific features of the invention herein described, and all statements of the scope of the invention which is a matter of language might be said to fall therebetween.

What is claimed is:

1. An eyeglass retainer comprising:
A semi-rigid strap having two ends,
means for attaching each end of said strap to the temples of the eyeglasses to be retained on the head of the wearer of the eyeglasses;
means for maintaining said strap in more than one fixed position away from the head and neck of the wearer when the eyeglasses are worn over the ears of said wearer;
wherein the semi-rigid strap is a cable or monofilament;
wherein said means for maintaining said cable or monofilament in more than one fixed position away from the head and neck of the comprises an articulated joint;
wherein said articulated joint comprises a ball male fitting including a ball or truncated ball having a particular diameter, said ball male fitting being attached to said means for attaching each end of said cable to the temples of the eyeglasses; and
wherein the ends of the cable or monofilament are attached to a female socket connected to said ball male fitting and having an inner surface defining an arc whose diameter is substantially the same as or very slightly less than the diameter of said ball male fitting so that it fits snuggly on said ball male fitting when connected to it.

2. The eyeglass retainer of claim 1 wherein the circumference of said inner surface of said female socket is slightly more than ½ of the circumference of the ball male fitting.

3. An eyeglass retainer system comprising the eyeglass retainer of claim 1 comprising more than one size means for attaching each end of the cable to the temples of the eyeglasses, each of said means being able to be attached to said female socket at the end of the cable or monofilament.

4. An eyeglass retainer system comprising the eyeglass retainer of claim 1 comprising more than one length cable each being able to be attached to the means for attaching each end of said cable or monofilament to the temples of the eyeglasses.

5. An eyeglass retainer comprising:
A semi-rigid strap having two ends,
means for attaching each end of said strap to the temples of the eyeglasses to be retained on the head of the wearer of the eyeglasses;
means for maintaining said strap in more than one fixed position away from the head and neck of the wearer when the eyeglasses are worn over the ears of said wearer;
wherein the semi-rigid strap is a cable or monofilament;
wherein said means for maintaining said cable or monofilament in more than one fixed position away from the head and neck of the comprises an articulated joint;
wherein said articulated joint comprises a ball male fitting including a ball or truncated ball having a particular diameter, said ball male fitting being attached to the ends of the cable or monofilament; and
wherein said means for attaching each end of said cable to the temples of the eyeglasses are attached to a female socket which in turn is connected to said ball male fitting, said female socket having an inner surface defining an arc whose diameter is substantially the same as the diameter of said ball male fitting so that it fits snuggly on said ball male fitting when connected to it.

* * * * *